US012810523B2

(12) United States Patent
Yamao

(10) Patent No.: US 12,810,523 B2
(45) Date of Patent: Nov. 24, 2026

(54) COMPUTER-READABLE RECORDING MEDIUM STORING TRAINING PROGRAM, GENERATION PROGRAM, TRAINING METHOD, AND GENERATION METHOD

(71) Applicant: Fujitsu Limited, Kawasaki (JP)

(72) Inventor: Sosuke Yamao, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 18/764,713

(22) Filed: Jul. 5, 2024

(65) Prior Publication Data

US 2024/0362849 A1 Oct. 31, 2024

Related U.S. Application Data

(63) Continuation of application No. PCT/JP2022/008292, filed on Feb. 28, 2022.

(51) Int. Cl.
*G06T 15/00* (2011.01)
*G06V 10/774* (2022.01)
*G06V 40/20* (2022.01)

(52) U.S. Cl.
CPC ............ *G06T 15/00* (2013.01); *G06V 10/774* (2022.01); *G06V 40/23* (2022.01)

(58) Field of Classification Search
CPC ........... G06T 13/40; G06T 15/00; G06T 7/00; G06V 10/34; G06V 10/774; G06V 10/82; G06V 20/64; G06V 40/23
See application file for complete search history.

(56) References Cited

U.S. PATENT DOCUMENTS

2015/0213646 A1* 7/2015 Ma .......................... G06T 17/20 345/420
2020/0042782 A1 2/2020 Masui et al.
2020/0058137 A1* 2/2020 Pujades .................. G06V 40/23
(Continued)

FOREIGN PATENT DOCUMENTS

CN 110008802 A * 7/2019 ........... G06V 40/161
JP 2014-044653 3/2014
(Continued)

OTHER PUBLICATIONS

M. Naureen et al., "AMASS: Archive of Motion Capture as Surface Shapes", ICCV2019, Apr. 15, 2019.
(Continued)

*Primary Examiner* — Ming Wu
(74) *Attorney, Agent, or Firm* — Fujitsu Intellectual Property Center

(57) ABSTRACT

A non-transitory computer-readable recording medium storing a training program for causing a computer to perform a process includes: obtaining a model of an object that includes a three-dimensional surface; generating image data in which the model of the object is rendered; specifying three-dimensional skeleton data of the rendered image data by inputting the rendered image data to a first learner trained with image data of an object included in training data as an explanatory variable and three-dimensional skeleton data of the training data as an objective variable; and executing training of a second learner with the specified three-dimensional skeleton data as an objective variable and the model of the object as an explanatory variable.

8 Claims, 13 Drawing Sheets

(56) References Cited

U.S. PATENT DOCUMENTS

| | | | |
|---|---|---|---|
| 2021/0216759 A1 | 7/2021 | Asayama et al. | |
| 2021/0326690 A1* | 10/2021 | Pégard | G03H 1/0808 |
| 2022/0036579 A1 | 2/2022 | Liang et al. | |
| 2022/0237349 A1 | 7/2022 | Kisamori et al. | |
| 2023/0101893 A1 | 3/2023 | Ebisuno | |

FOREIGN PATENT DOCUMENTS

| | | |
|---|---|---|
| JP | 2018-129007 | 8/2018 |
| JP | 2019-016164 | 1/2019 |
| JP | 2019-046007 | 3/2019 |
| JP | 2020-190959 | 11/2020 |
| JP | 2021-174059 | 11/2021 |
| WO | 2018/207365 A1 | 11/2018 |
| WO | 2020/084667 A1 | 4/2020 |

OTHER PUBLICATIONS

WIPO—International Search Report with English language translation and Written Opinion mailed on May 24, 2022 for International Application No. PCT/JP2022/008292 [9 pages].

Yang Ze et al: "S3: Neural Shape, Skeleton, and Skinning Fields for 3D Human Modeling", 2021 IEEE/CVF Conference on Computervision and Pattern Recognition (CVPR), IEEE, Jun. 20, 2021 (Jun. 20, 2021), pp. 13279-13288, XP034008994, DOI: 10.1109/CVPR46437.2021.01308 [retrieved on Oct. 15, 2021].

EESR—Extended European Search Report dated Mar. 21, 2025 from corresponding European Patent Application No. 22928749.5 [8 pages].

* cited by examiner

FIG. 2
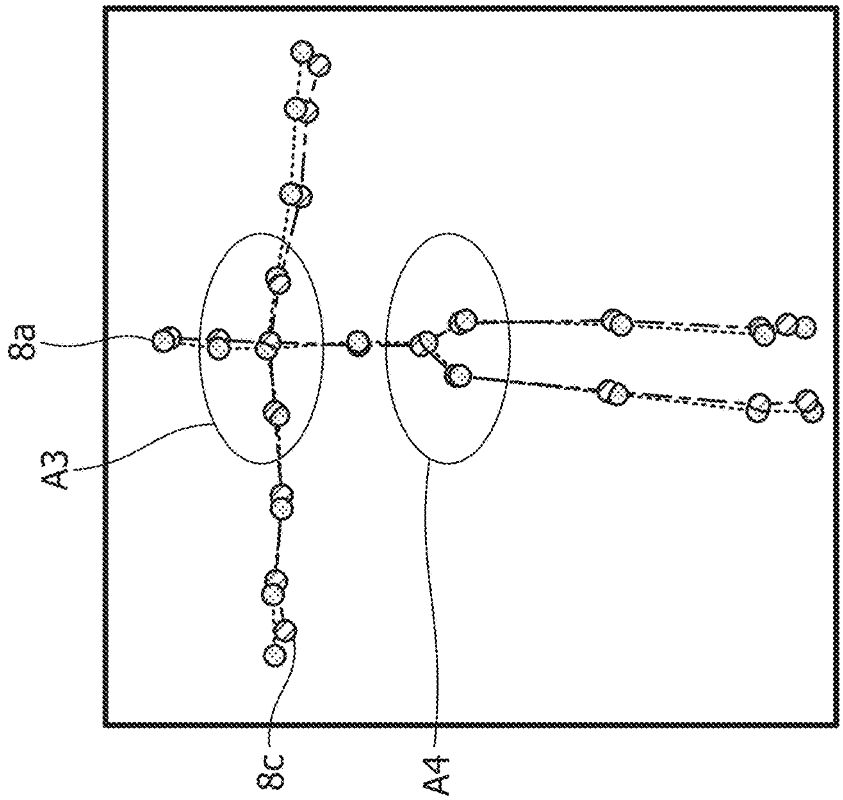
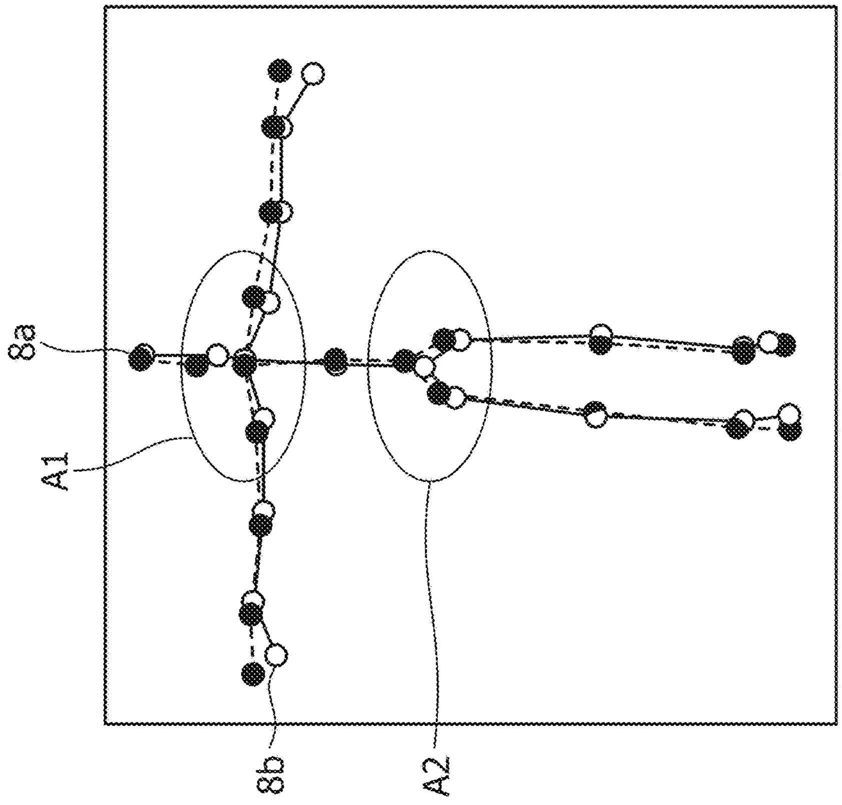

FIG. 4

50

| ITEM NUMBER | IMAGE DATA | 3D SKELETON DATA | CAMERA PARAMETER |
|---|---|---|---|
| 1 | IMAGE DATA OF ITEM NUMBER 1 | 3D SKELETON DATA CORRESPONDING TO IMAGE DATA OF ITEM NUMBER 1 | PARAMETER OF CAMERA FOR CAPTURING IMAGE DATA OF ITEM NUMBER 1 |
| 2 | IMAGE DATA OF ITEM NUMBER 2 | 3D SKELETON DATA CORRESPONDING TO IMAGE DATA OF ITEM NUMBER 2 | PARAMETER OF CAMERA FOR CAPTURING IMAGE DATA OF ITEM NUMBER 2 |
| 3 | IMAGE DATA OF ITEM NUMBER 3 | 3D SKELETON DATA CORRESPONDING TO IMAGE DATA OF ITEM NUMBER 3 | PARAMETER OF CAMERA FOR CAPTURING IMAGE DATA OF ITEM NUMBER 3 |
| ... | ... | ... | ... |

FIG. 6

142

| ITEM NUMBER | 3D BODY CG MODEL | 3D SKELETON DATA |
|---|---|---|
| 1 | DATA OF 3D BODY CG MODEL | 3D SKELETON DATA OBTAINED BY INPUTTING 3D BODY CG MODEL OF ITEM NUMBER 1 TO REGRESSION MODEL |
| 2 | DATA OF 3D BODY CG MODEL | 3D SKELETON DATA OBTAINED BY INPUTTING 3D BODY CG MODEL OF ITEM NUMBER 2 TO REGRESSION MODEL |
| 3 | DATA OF 3D BODY CG MODEL | 3D SKELETON DATA OBTAINED BY INPUTTING 3D BODY CG MODEL OF ITEM NUMBER 3 TO REGRESSION MODEL |
| ... | ... | ... |

COMPUTER-READABLE RECORDING MEDIUM STORING TRAINING PROGRAM, GENERATION PROGRAM, TRAINING METHOD, AND GENERATION METHOD

CROSS-REFERENCE TO RELATED APPLICATION

This application is a continuation application of International Application PCT/JP2022/008292 filed on Feb. 28, 2022 and designated the U.S., the entire contents of which are incorporated herein by reference.

FIELD

The present invention relates to a non-transitory computer-readable recording medium storing a training program and the like.

BACKGROUND

For detection of three-dimensional motion of a person, a three-dimensional (3D) sensing technology has been established that detects 3D skeleton coordinates of a person with accuracy of ±1 cm from a plurality of 3D laser sensors. This 3D sensing technology is expected to be applied to a gymnastics scoring support system and to be developed to other sports and other fields. A method using a 3D laser sensor is referred to as a laser method.

In the laser method, a laser beam is irradiated approximately two million times per second, and a depth and information of each irradiation point including a target person are obtained based on a travel time (time of flight (ToF)) of the laser beam. Although the laser method may obtain highly accurate depth data, it has a disadvantage that hardware is complex and expensive due to a complex configuration and processing of laser scanning and ToF measurement.

Instead of the laser method, 3D skeleton recognition may be performed by an image method. The image method is a method that obtains Red Green Blue (RGB) data of each pixel by a complementary metal oxide semiconductor (CMOS) imager, in which an inexpensive RGB camera may be used. With the improvement of deep learning technology in recent years, the accuracy of the 3D skeleton recognition is also being improved.

In the 3D skeleton recognition of the image method based on deep learning, a large amount of training data need to be prepared to train a skeleton recognition model. For example, the training data includes body images, 3D joint positions (or 2D joint positions), and camera parameters.

Examples of a method for collecting the training data described above include a motion capture system in which a special marker is attached to a surface to measure body motion. In addition, there is also a method of semi-automatically annotating a joint with respect to images captured from a plurality of viewpoints without using special equipment.

In general, when data of a condition not included in the training data is input to the trained skeleton recognition model, the skeleton may not be correctly recognized. Thus, a technique of retraining the skeleton recognition model is taken to collect new training data to combine it with the existing training data set as needed. Note that the conditions of the training data include a body posture, a camera angle, an appearance, and the like. The appearance indicates information regarding appearance of the foreground and the background. In the following descriptions, the existing training data set will be referred to as an "existing data set".

Here, in a case of collecting new training data using the motion capture system or the method of semi-automatically annotating a joint with respect to images captured from a plurality of viewpoints, image shooting is performed on site. Furthermore, since the condition that may be collected is limited or the cost for the data collection increases, training data of an optional condition may not be efficiently collected.

Meanwhile, it is conceivable to use a technique of reinforcing the existing data set by efficiently collecting the training data of the optional condition by a technique of synthesizing virtual training data using a 3D body computer graphics (CG) model. In this case, the number of joints and joint positions of the 3D body CG model need to be adjusted to match the joint definition of the existing data set. This is because the recognition accuracy of the trained skeleton recognition model decreases when retraining is carried out using training data generated using a 3D body CG model with a joint definition different from the joint definition of the existing data set.

FIG. 12 is a diagram illustrating an example of the joint definitions of the existing data set and the 3D body CG model. For example, a joint definition 5*a* of the existing data set is defined by 21 joints. On the other hand, a joint definition 5*b* of the 3D body CG model is defined by 24 joints. According to an existing technique, a user visually checks the difference between the joint definition 5*a* and the joint definition 5*b*, and manually adjusts the number of joints and the joint positions of the joint definition 5*b* such that the joint definition 5*b* matches the joint definition 5*a*, thereby creating a joint definition 5*c*. The number of joints of the joint definition 5*c* is similar to the number of joints (21 joints) of the joint definition 5*a*.

Here, when positional information of a marker attached to the surface of the person is included in the existing data set, the 3D body CG model having the joint definition corresponding to the existing data set may be automatically calculated using such positional information. In the following descriptions, the positional information of the marker attached to the surface will be referred to as marker position information.

FIG. 13 is a diagram for explaining an example of the existing technique. For example, in a case of generating training data using the motion capture system, marker position information 6*c* is obtained in addition to image data 6*a* and 3D skeleton data 6*b* in the existing data set. 3D body CG model estimation using marker position information is carried out using the marker position information 6*c*, whereby a 3D body CG model 7 may be obtained. A joint definition of the 3D body CG model 7 is similar to the joint definition of the existing data set.

Using the existing technique of FIG. 13, a pair of the 3D skeleton data 6*b* and the 3D body CG model 7 is obtained. By using this pair, it becomes possible to generate a regression model that generates 3D skeleton data (3D joint information) from the 3D body CG model. Furthermore, since the 3D skeleton data may be generated from various 3D body CG models by using this regression model, it becomes possible to easily add a 3D joint position to be used in training data of any condition.

Japanese Laid-open Patent Publication No. 2014-044653 and M. Naureen et al., "AMASS: Archive of Motion Capture as Surface Shapes," ICCV2019 are disclosed as related art.

SUMMARY

According to an aspect of the embodiments, a non-transitory computer-readable recording medium storing a training program for causing a computer to perform a process includes: obtaining a model of an object that includes a three-dimensional surface; generating image data in which the model of the object is rendered; specifying three-dimensional skeleton data of the rendered image data by inputting the rendered image data to a first learner trained with image data of an object included in training data as an explanatory variable and three-dimensional skeleton data of the training data as an objective variable; and executing training of a second learner with the specified three-dimensional skeleton data as an objective variable and the model of the object as an explanatory variable.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for explaining an effect of the information processing apparatus according to the present embodiment.

FIG. 4 is a diagram illustrating an exemplary data structure of an existing data set.

FIG. 6 is a diagram illustrating an exemplary data structure of a regression data set.

DESCRIPTION OF EMBODIMENTS

In the technique of manually adjusting the joint definition of the 3D body CG model described above, a result of the adjustment of the joint positions inside the body in which it is difficult to define the positions from a body shape is dependent on personal skills, and the accuracy of the joint definition is dependent on a worker skill. Furthermore, in a case of preparing a large number of 3D body CG models, it is not realistic to manually adjust the joint definition of each 3D body CG model.

While a 3D body CG model conforming to the joint definition of the existing data set may be automatically generated by executing 3D body CG model estimation or the like using the marker position information when the marker position information is included in the existing data set, it may not be used when the marker position information is not included.

Note that the recognition accuracy of the trained skeleton recognition model decreases when retraining is carried out using training data generated using a 3D body CG model with a joint definition different from the joint definition of the existing data set.

Thus, there is a need to generate 3D skeleton data conforming to the joint definition of the existing data set from any 3D body CG model even when there is no marker position information in the existing data set.

In one aspect, an object of the present invention is to provide a training program, a generation program, a training method, and a generation method capable of generating 3D skeleton data conforming to a joint definition of an existing data set from any 3D body CG model.

Hereinafter, an embodiment of a training program, a generation program, a training method, and a generation method disclosed in the present application will be described in detail with reference to the drawings. Note that the present invention is not limited by the embodiment.

Embodiment

Figure 1:
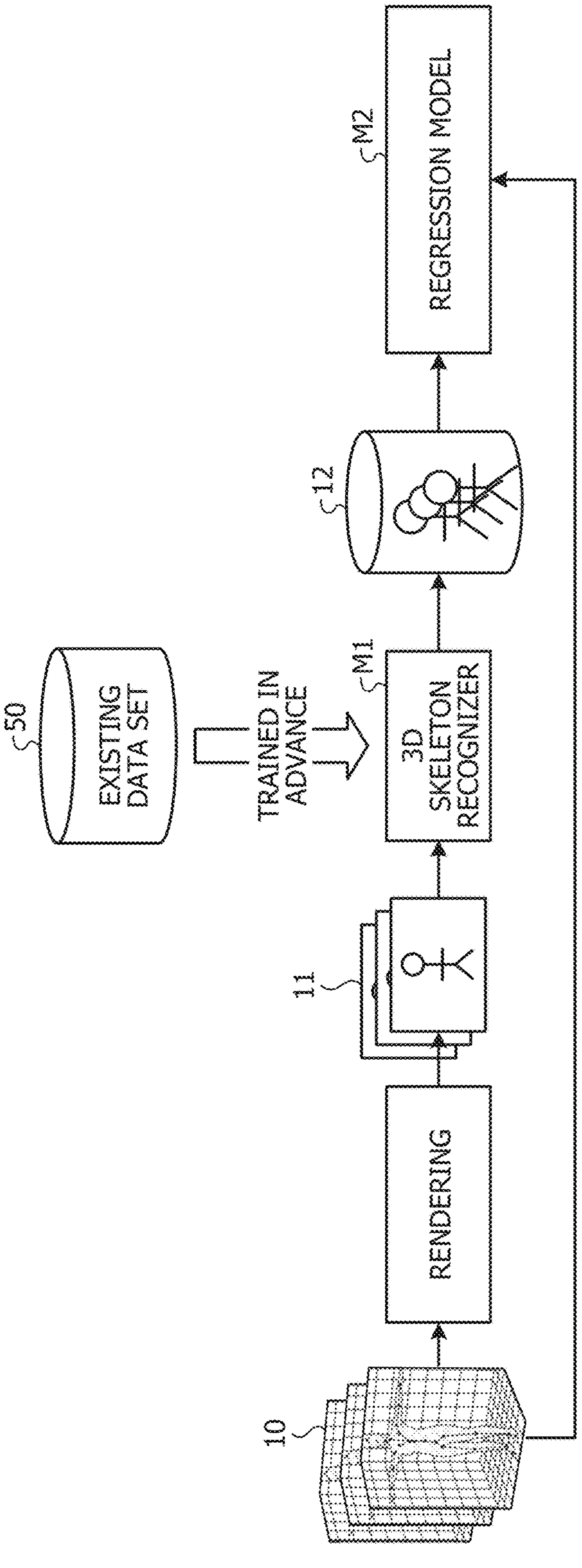
FIG. 1 is a diagram for explaining processing of an information processing apparatus according to the present embodiment.

An example of processing of an information processing apparatus according to the present embodiment will be described. FIG. 1 is a diagram for explaining the processing of the information processing apparatus according to the present embodiment. The information processing apparatus trains a 3D skeleton recognizer M1 in advance using an existing data set 50. The existing data set 50 includes a plurality of pieces of training data.

For example, a set of image data, 3D skeleton data, and a camera parameter is included as the training data. The image data is image data of a person captured by a camera. The 3D skeleton data is information including three-dimensional joint positions (coordinates of joints) of the person. The camera parameter is a parameter of the camera that has captured the image (image data).

The information processing apparatus trains the 3D skeleton recognizer M1 using the image data included in the training data as an input (explanatory variable) and the 3D skeleton data as an output (ground truth label, objective variable). The 3D skeleton recognizer M1 is a neural network or the like. In the following descriptions, the trained 3D skeleton recognizer M1 will be simply referred to as a 3D skeleton recognizer M1. When the image data is input to the 3D skeleton recognizer M1, the 3D skeleton data is output.

The information processing apparatus obtains a 3D body CG model 10. The 3D body CG model 10 is a model of an object (person) including a three-dimensional surface. For example, a plurality of surfaces included in the model of the object (person) is a plurality of meshes. The information processing apparatus generates composite image data 11 by rendering the 3D body CG model 10. The information processing apparatus inputs the composite image data 11 to the 3D skeleton recognizer M1 to infer 3D skeleton data 12. The information processing apparatus repeatedly executes such processing to obtain a plurality of sets of the 3D body CG model 10 and the 3D skeleton data 12.

After the processing described above, the information processing apparatus trains a regression model M2 using the 3D body CG model 10 as an input (explanatory variable) and the 3D skeleton data 12 as an output (ground truth label, objective variable). The regression model M2 is a neural network or the like. When an optional 3D body CG model is input to the trained regression model M2, 3D skeleton data conforming to the joint definition of the existing data set 50, which is 3D skeleton data corresponding to the optional 3D body CG model, may be generated.

For example, the information processing apparatus adds, to the existing data set 50, the 3D skeleton data inferred by inputting the optional 3D body CG model to the trained regression model M2. In the case of adding the inferred 3D skeleton data, the information processing apparatus may generate image data to be paired based on the optional 3D body CG model. The information processing apparatus retrains the 3D skeleton recognizer M1 using the existing data set 50 to which the inferred 3D skeleton data is added.

As described above, the information processing apparatus according to the present embodiment generates the composite image data 11 by rendering the 3D body CG model 10, and inputs the composite image data 11 to the 3D skeleton recognizer M1 to infer the 3D skeleton data 12. The information processing apparatus repeatedly executes such processing to obtain a plurality of sets of the 3D body CG model 10 and the 3D skeleton data 12. Here, the rendering is processing of projecting the 3D body CG model 10 onto an image using image processing. For example, the 3D body CG model 10 is converted into 2D image information by the rendering.

Furthermore, the information processing apparatus trains the regression model M2 using the 3D body CG model 10 as an input and the 3D skeleton data 12 as an output. When an optional 3D body CG model is input to the trained regression model M2, 3D skeleton data conforming to the joint definition of the existing data set 50, which is 3D skeleton data corresponding to the optional 3D body CG model, may be generated.

As a result, even when there is no marker position information in the existing data set, the 3D skeleton data conforming to the joint definition of the existing data set 50 may be generated from the optional 3D body CG model. For example, the 3D skeleton data may be easily generated by a 3D body CG model of a condition not included in the original training data being input to the regression model M2. By adding such 3D skeleton data to the existing data set 50 and retraining the 3D skeleton recognizer M1, it becomes possible to improve the recognition accuracy in the case where image data of a condition not included in the original training data is input.

FIG. 2 is a diagram for explaining an effect of the information processing apparatus according to the present embodiment. In FIG. 2, 3D skeleton data 8*a* is data based on the joint definition of the existing data set. 3D skeleton data 8*b* is 3D skeleton data of a 3D body CG model without using the regression model M2. 3D skeleton data 8*c* is 3D skeleton data of a 3D body CG model estimated using the regression model M2.

When the 3D skeleton data 8*a* and the 3D skeleton data 8*b* are compared with each other, a difference of approximately 5 to 7 cm between joints is present in regions A1 and A2. Thus, if the 3D skeleton data 8*b* is added to the existing data set 50 to retrain the 3D skeleton recognizer M1, the recognition accuracy of the 3D skeleton recognizer M1 decreases.

On the other hand, when the 3D skeleton data 8*a* and the 3D skeleton data 8*c* are compared with each other, a difference between joints is approximately 1 cm in regions A3 and A4. Thus, the 3D skeleton data 8*c* is 3D skeleton data conforming to the joint definition of the existing data set 50, and if such 3D skeleton data 8*c* is added to the existing data set 50 to retrain the 3D skeleton recognizer M1, the recognition accuracy of the 3D skeleton recognizer M1 may be improved.

Figure 3:
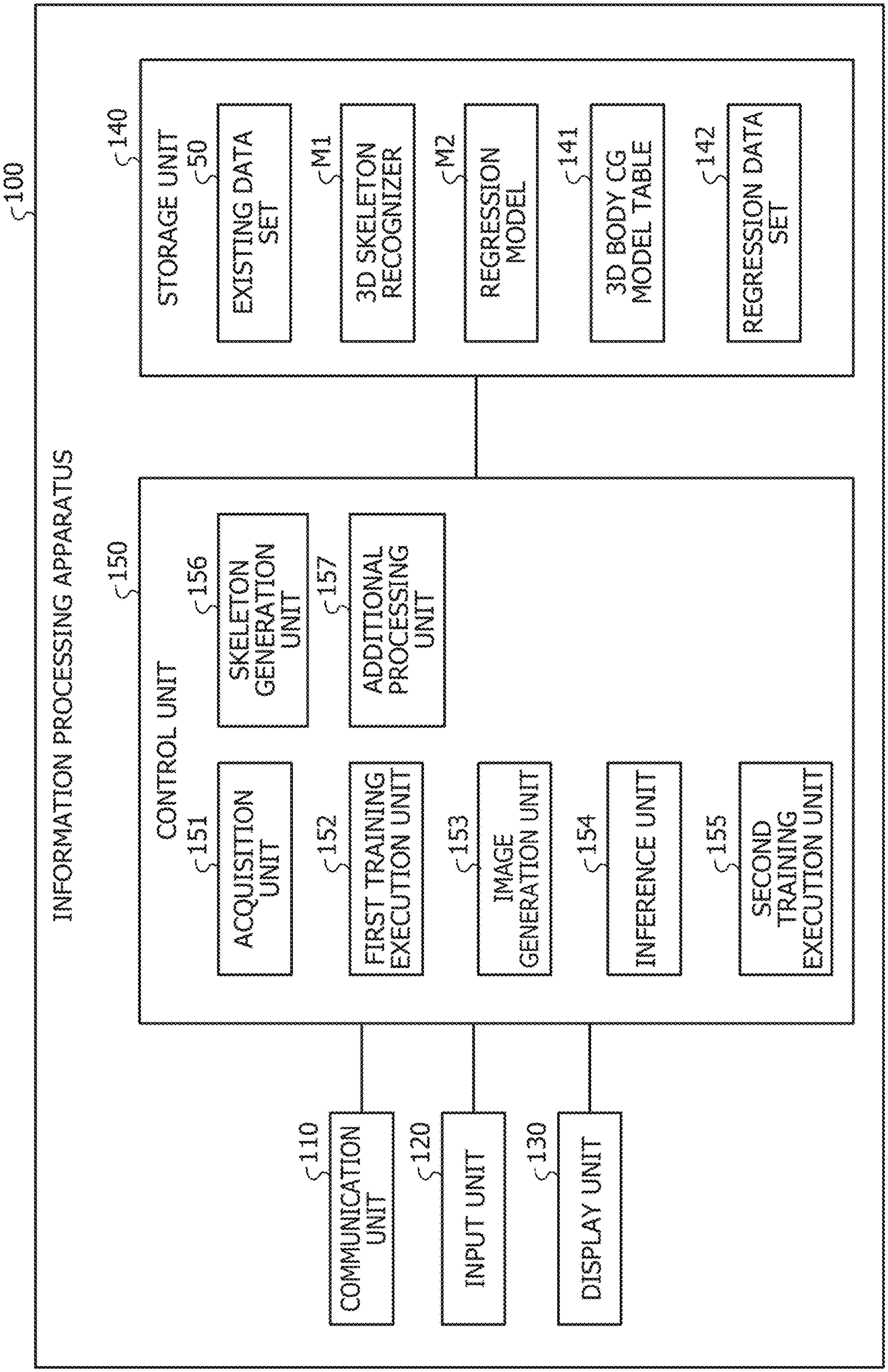
FIG. 3 is a functional block diagram illustrating a configuration of the information processing apparatus according to the present embodiment.

Next, an exemplary configuration of the information processing apparatus that executes the processing described with reference to FIG. 1 will be described. FIG. 3 is a functional block diagram illustrating a configuration of the information processing apparatus according to the present embodiment. As illustrated in FIG. 3, this information processing apparatus 100 includes a communication unit 110, an input unit 120, a display unit 130, a storage unit 140, and a control unit 150.

The communication unit 110 performs data communication with an external device or the like via a network. The communication unit 110 receives the existing data set 50 and the like from the external device.

The input unit 120 is an input device that receives an operation made by a user, and is implemented by, for example, a keyboard, a mouse, or the like.

The display unit 130 is a display device for outputting a result of processing of the control unit 150, and is implemented by, for example, a liquid crystal monitor, a printer, or the like.

The storage unit 140 is a storage device that stores various types of information, and is implemented by, for example, a semiconductor memory element such as a random access memory (RAM) or a flash memory, or a storage device such as a hard disk or an optical disk.

The storage unit 140 includes the existing data set 50, the 3D skeleton recognizer M1, the regression model M2, a 3D body CG model table 141, and a regression data set 142.

The existing data set 50 includes a plurality of pieces of training data to be used to train the 3D skeleton recognizer M1. FIG. 4 is a diagram illustrating an exemplary data structure of the existing data set. As illustrated in FIG. 4, this existing data set 50 associates item numbers, image data, 3D skeleton data, and camera parameters. The item number is a number for identifying a record (training data) of the existing data set 50. The image data is image data of a person captured by a camera. The 3D skeleton data is information including three-dimensional joint positions of the person. The camera parameter is a parameter of the camera that has captured the image.

The 3D skeleton recognizer M1 is a training model that outputs 3D skeleton data when image data is input. The 3D skeleton recognizer M1 is a neural network or the like.

The regression model M2 is a training model that outputs 3D skeleton data when a 3D body CG model is input. The regression model M2 is a neural network or the like.

Figure 5:
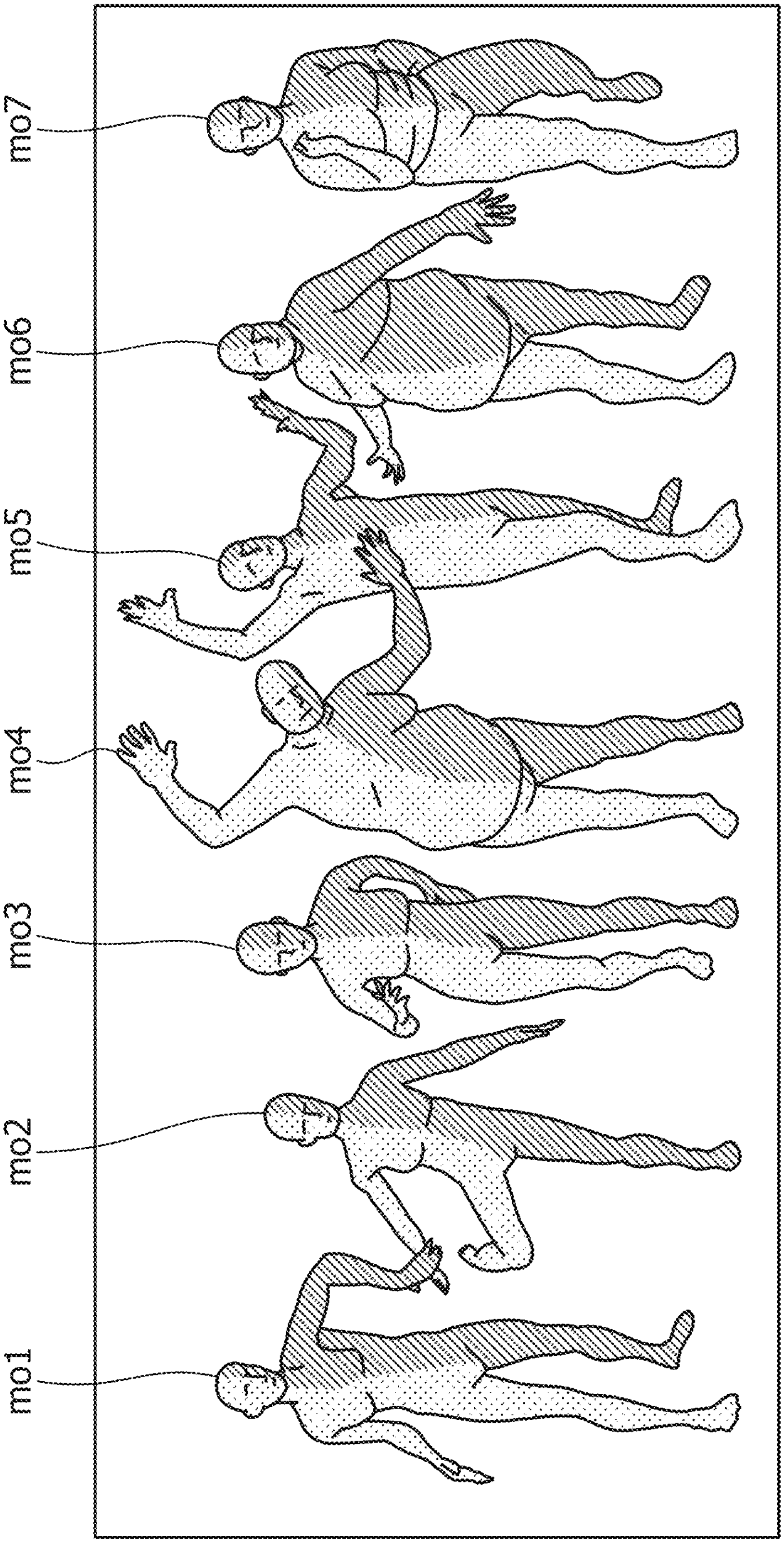
FIG. 5 is a diagram illustrating an example of a 3D body CG model.

The 3D body CG model table 141 includes a plurality of 3D body CG models. FIG. 5 is a diagram illustrating an example of the 3D body CG model. As illustrated in FIG. 5, the 3D body CG model table 141 includes 3D body CG models mo1, mo2, mo3, mo4, mo5, mo6, and mo7 of various conditions. While FIG. 5 illustrates the 3D body CG models mo1 to mo7 as an example, it is not limited to this.

The regression data set 142 stores a plurality of sets of the 3D body CG model and the 3D skeleton data. FIG. 6 is a diagram illustrating an exemplary data structure of the regression data set. As illustrated in FIG. 6, this regression data set 142 associates item numbers, 3D body CG models, and 3D skeleton data. The item number is a number for identifying a record of the regression data set 142. The 3D body CG model is, for example, data of the 3D body CG model described with reference to FIG. 5. The 3D skeleton data is 3D skeleton data obtained by inputting the 3D body CG model to the trained regression data set 142.

The description returns to FIG. 3. The control unit 150 is implemented by a processor such as a central processing unit (CPU) or a micro processing unit (MPU) executing various programs stored in a storage device inside the information processing apparatus 100 using a RAM or the like as a workspace. Furthermore, the control unit 150 may be implemented by an integrated circuit such as an application specific integrated circuit (ASIC) or a field programmable gate array (FPGA).

The control unit 150 includes an acquisition unit 151, a first training execution unit 152, an image generation unit 153, an inference unit 154, a second training execution unit 155, a skeleton generation unit 156, and an additional processing unit 157.

The acquisition unit 151 obtains various types of data from an external device or the like, and stores the obtained data in the storage unit 140. The acquisition unit 151 may obtain the various types of data from the input unit 120. For example, the acquisition unit 151 obtains the existing data set 50, and stores the obtained existing data set 50 in the storage unit 140. The acquisition unit 151 obtains data of the 3D body CG model, and stores the obtained data of the 3D body CG model in the 3D body CG model table 141.

The first training execution unit 152 trains the 3D skeleton recognizer M1 using the training data stored in the existing data set 50 (executes machine learning). The first training execution unit 152 trains the 3D skeleton recognizer M1 using the image data of the training data as an input and the 3D skeleton data as an output. For example, the first training execution unit 152 trains parameters of the 3D skeleton recognizer M1 based on a backpropagation training method or the like.

Furthermore, when new training data is added to the existing data set 50, the first training execution unit 152 retrains the 3D skeleton recognizer M1 including the training data stored in the existing data set 50.

The image generation unit 153 obtains data of the 3D body CG model from the 3D body CG model table 141, and performs rendering on the 3D body CG model, thereby generating composite image data.

For example, the image generation unit 153 executes rendering from N viewpoints to generate a plurality of pieces of image data, and combines the plurality of pieces of image data into composite image data. N corresponds to the number of pieces of image data (natural number of 1 or more) input to the 3D skeleton recognizer M1, and is set in advance.

The image generation unit 153 outputs, to the inference unit 154, a set of the generated composite image data and the 3D body CG model having been subject to the rendering.

The inference unit 154 inputs the composite image data obtained from the image generation unit 153 to the trained 3D skeleton recognizer M1 to infer 3D skeleton data. The inference unit 154 registers, in the regression data set 142, the inferred 3D skeleton data and the data of the 3D body CG model corresponding to the composite image data in association with each other.

Meanwhile, when the 3D skeleton data is inferred, the inference unit 154 may determine whether or not each joint position of the 3D skeleton data is appropriate and perform processing of excluding a joint at an inappropriate position. For example, the inference unit 154 executes a first removal process or a second removal process to be described below. The inference unit 154 may execute either one of the removal processes of the first removal process and the second removal process, or may execute both removal processes.

Figure 7:
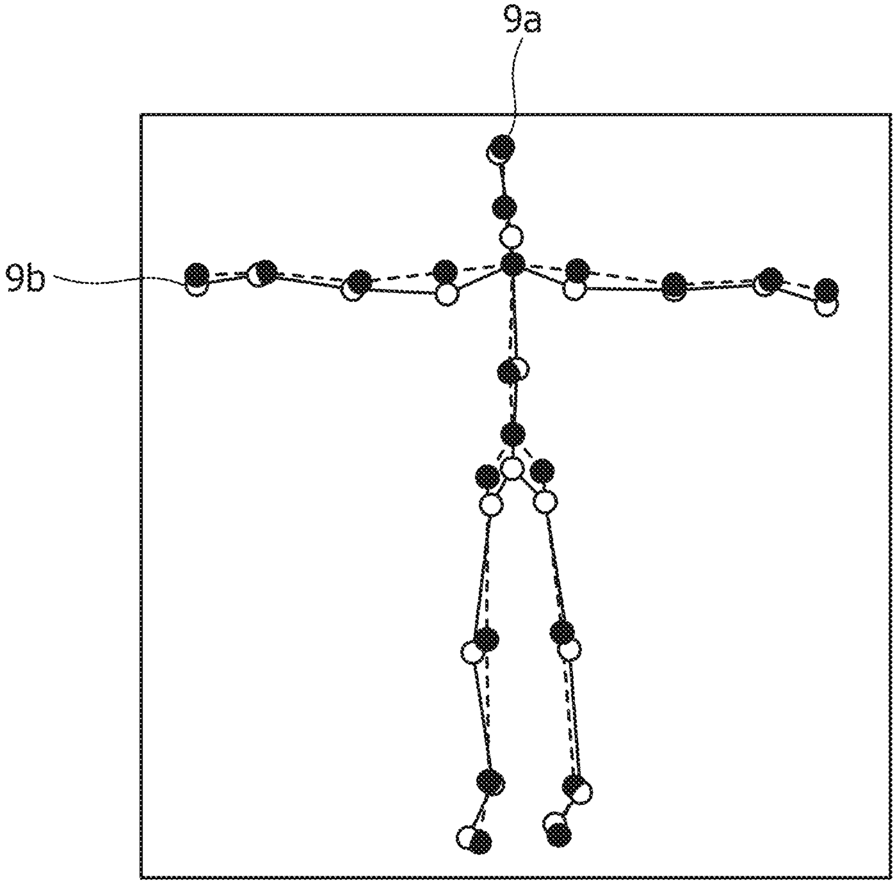
FIG. 7 is a diagram for explaining a first removal process.

The first removal process to be executed by the inference unit 154 will be described. FIG. 7 is a diagram for explaining the first removal process. The inference unit 154 compares 3D skeleton data 9*a* in accordance with the joint definition of the existing data set 50 prepared in advance with 3D skeleton data 9*b* generated by the skeleton generation unit 156. When a distance between a certain joint (e.g., ankle) in the 3D skeleton data 9*a* and a certain joint in the 3D skeleton data 9*b* is equal to or longer than a threshold, the inference unit 154 removes the certain joint in the 3D skeleton data 9*b*. Joints other than the ankle are treated in a similar manner.

Figure 8:
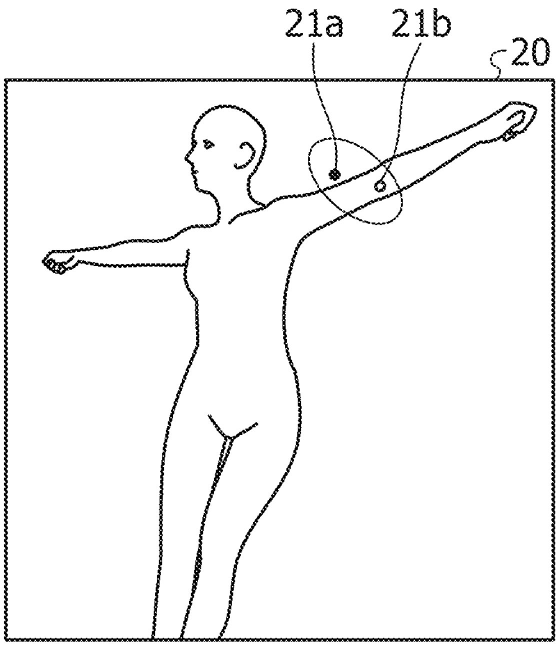
FIG. 8 is a diagram for explaining a second removal process.

The second removal process to be executed by the inference unit 154 will be described. FIG. 8 is a diagram for explaining the second removal process. The inference unit 154 compares surface positions of a 3D body CG model 20 in accordance with the joint definition of the existing data set 50 with joint positions of the 3D skeleton data, and leaves joints existing inside the 3D body CG model 20 and removes joints existing outside among individual joints of the 3D skeleton data. In the example illustrated in FIG. 8, the inference unit 154 leaves a joint 21*b* existing inside the 3D body CG model 20, and removes a joint 21*a* existing outside.

The image generation unit 153 and the inference unit 154 repeatedly perform the processing described above on the data of each 3D body CG model stored in the 3D body CG model table 141 to generate a plurality of sets of the 3D skeleton data and the 3D body CG model, and store them in the regression data set 142.

The second training execution unit 155 trains the regression model M2 based on the sets (training data) of the 3D skeleton data and the 3D body CG model stored in the regression data set 142. For example, the second training execution unit 155 searches for a parameter (value of weight $J_i$) of the regression model M2 based on an objective function of an equation (1).

[Equation 1]

$$E = \sum_{i}^{N_{data}} \sum_{j}^{N_{joint}} \|V_i J_j - p_{i,j}\|_2 + \lambda \sum_{j}^{N_{joint}} \|\|J_j\|_2 - 1\|_2 \tag{1}$$

In the equation (1), "$N_{data}$" represents the number of pieces of regression training data. For example, the number of pieces of regression training data is the number of sets of the 3D skeleton data and the 3D body CG model stored in the regression data set 142. "$N_{joint}$" represents the number of joints in the joint definition of the existing data set 50.

When "$N_{vert}$" is set as the number of 3D vertices of the 3D body CG model, "$V_i$" in the equation (1) represents a vertex coordinate group ($3\times N_{vert}$ matrix) of the 3D body CG model in the i-th training data (set of 3D skeleton data and 3D body CG model). "$J_i$" represents a weight ($N_{vert}$ dimensional vector) for linear regression of 3D coordinates of a joint i from $V_i$.

In the equation (1), "$p_{i,j}$" represents 3D coordinates (three-dimensional vector) of a joint j in the 3D skeleton data in the i-th training data. "λ" represents a weight coefficient (scalar) related to a normalization term.

The second training execution unit 155 is enabled to cause the 3D joint to regress to the inside of the vertex group $V_i$ of the 3D body CG model by optimizing the equation (1) by a non-negative least squares method to satisfy $J_j \geq 0$.

For the joint j, the second training execution unit 155 assumes that only the vertex group $V_{i,j} \subseteq V_i$ in the local vicinity thereof affects the definition of the joint position, and carries out "regression of $p_{i,j}$ from $V_{i,j}$", whereby more stable 3D skeleton data may be generated. For example, at the time of regression of the ankle position, an influence exerted by a position of an irrelevant head vertex group may be avoided.

While the processing in which the second training execution unit 155 trains the regression model M2 based on the objective function of the equation (1) has been described here, training based on the backpropagation training method may be carried out using a 3D body CG model as an input and 3D skeleton data as an output.

Next, processing of the skeleton generation unit 156 and the additional processing unit 157 will be described. The skeleton generation unit 156 and the additional processing unit 157 obtain data of an optional 3D body CG model after the training of the regression model M2 is complete, and generate training data to be added to the existing data set 50. The data of the optional 3D body CG model may be obtained from the input unit 120, or may be obtained from an external device.

When the optional 3D body CG model is obtained, the skeleton generation unit 156 inputs the obtained 3D body CG model to the regression model M2 to generate 3D skeleton data. The skeleton generation unit 156 outputs the optional 3D body CG model and the generated 3D skeleton data to the additional processing unit 157.

The additional processing unit 157 adds the obtained 3D skeleton data to the existing data set 50 as training data. The additional processing unit 157 may perform rendering on the optional 3D body CG model to generate image data to be paired with the 3D skeleton data, and may add it to the existing data set 50. Furthermore, a camera parameter designated from an external device or the like may also be added to the existing data set 50.

Each time an optional 3D body CG model is obtained, the skeleton generation unit 156 and the additional processing unit 157 execute the process described above to generate new training data, and add the training data to the existing data set 50.

When new training data is added to the existing data set 50, the first training execution unit 152 described above retrains the 3D skeleton recognizer M1 including the training data stored in the existing data set 50.

Figure 9:
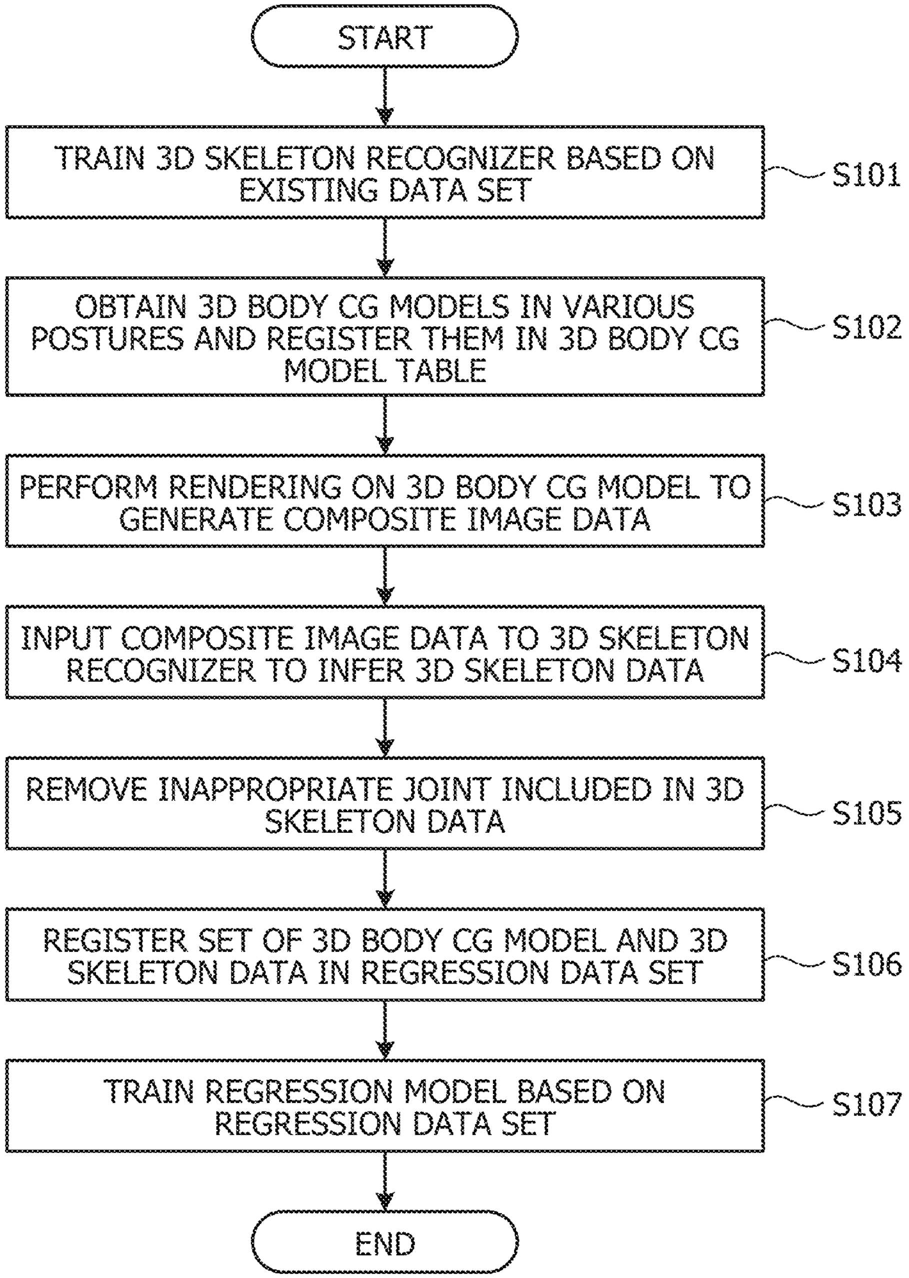
FIG. 9 is a flowchart (1) illustrating a processing procedure of the information processing apparatus according to the present embodiment.

Next, an exemplary processing procedure of the information processing apparatus 100 according to the present embodiment will be described. FIG. 9 is a flowchart (1) illustrating a processing procedure of the information processing apparatus according to the present embodiment. As illustrated in FIG. 9, the first training execution unit 152 of the information processing apparatus 100 trains the 3D skeleton recognizer M1 based on the existing data set 50 (step S101).

The acquisition unit 151 of the information processing apparatus 100 obtains 3D body CG models in various postures, and registers them in the 3D body CG model table 141 (step S102). The image generation unit 153 of the information processing apparatus 100 performs rendering on the 3D body CG models to generate composite image data (step S103).

The inference unit 154 of the information processing apparatus 100 inputs the composite image data to the 3D skeleton recognizer M1, and infers 3D skeleton data (step S104). The inference unit 154 removes an inappropriate joint included in the 3D skeleton data (step S105).

The inference unit 154 registers a set of the 3D body CG model and the 3D skeleton data in the regression data set 142 (step S106). The second training execution unit 155 of the information processing apparatus 100 trains the regression model M2 based on the regression data set 142 (step S107).

Figure 10:
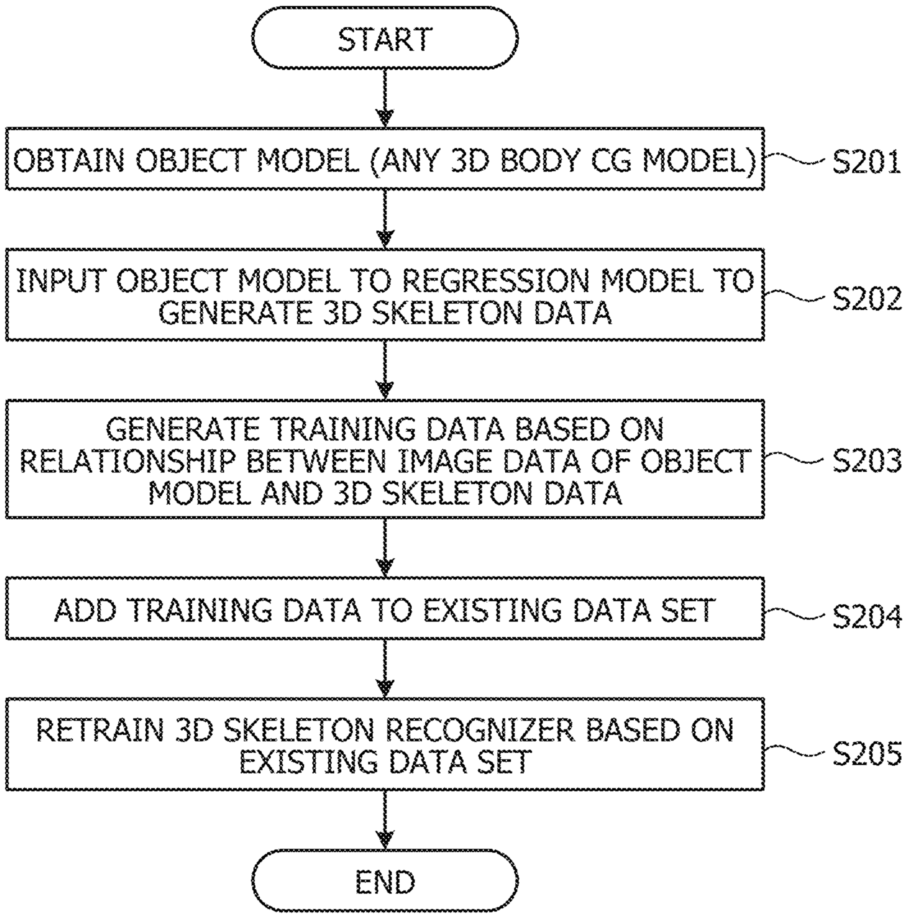
FIG. 10 is a flowchart (2) illustrating a processing procedure of the information processing apparatus according to the present embodiment.

FIG. 10 is a flowchart (2) illustrating a processing procedure of the information processing apparatus according to the present embodiment. The skeleton generation unit 156 of the information processing apparatus 100 obtains an object model (any 3D body CG model) (step S201).

The skeleton generation unit 156 inputs the object model to the regression model M2 to generate 3D skeleton data (step S202).

The additional processing unit 157 of the information processing apparatus 100 generates training data based on a relationship between the image data of the object model and the 3D skeleton data (step S203). The additional processing unit 157 adds the generated training data to the existing data set 50 (step S204).

The first training execution unit 152 of the information processing apparatus 100 retrains the 3D skeleton recognizer M1 based on the existing data set 50 (step S205).

Next, effects of the information processing apparatus 100 according to the present embodiment will be described. The information processing apparatus 100 generates composite image data by rendering a 3D body CG model, and inputs the composite image data to the 3D skeleton recognizer M1 to infer 3D skeleton data. The information processing apparatus 100 trains the regression model M2 using the 3D body CG model as an input and the 3D skeleton data as an output. As a result, an optional 3D body CG model may be input to the trained regression model M2 to generate 3D skeleton data conforming to the joint definition of the existing data set 50, which is 3D skeleton data corresponding to the optional 3D body CG model.

The information processing apparatus 100 inputs a 3D body CG model of a condition not included in the original training data to the trained regression model M2 to generate 3D skeleton data, and adds the 3D skeleton data to the existing data set 50. By retraining the 3D skeleton recognizer M1, the information processing apparatus 100 is enabled to improve the recognition accuracy in the case where image data of a condition not included in the original training data is input.

When the composite image data is input to the 3D skeleton recognizer M1 and the 3D skeleton data is inferred, the information processing apparatus 100 determines whether or not each joint position of the 3D skeleton data is appropriate, and performs processing of excluding a joint at an inappropriate position. As a result, registration of an outlier joint in the regression data set 142 may be suppressed, and the accuracy of the regression model M2 trained using the regression data set 142 may be improved.

In the case of training the regression model M2, the information processing apparatus 100 searches for a parameter that makes an absolute value of a difference between a multiplication value of the parameter and the vertex coordinate group of the object model and each joint position of the inferred three-dimensional skeleton data smaller. For example, the information processing apparatus 100 searches for a parameter (value of weight $J_i$) of the regression model M2 based on the objective function of the equation (1). As a result, a model capable of accurately inferring the 3D skeleton data from the 3D body CG model may be generated.

Since the information processing apparatus 100 is enabled to infer the 3D skeleton data by inputting the 3D body CG model to the trained regression model M2, the processing load may be reduced as compared with a case where the 3D skeleton data is inferred by directly analyzing the 3D body CG model.

Figure 11:
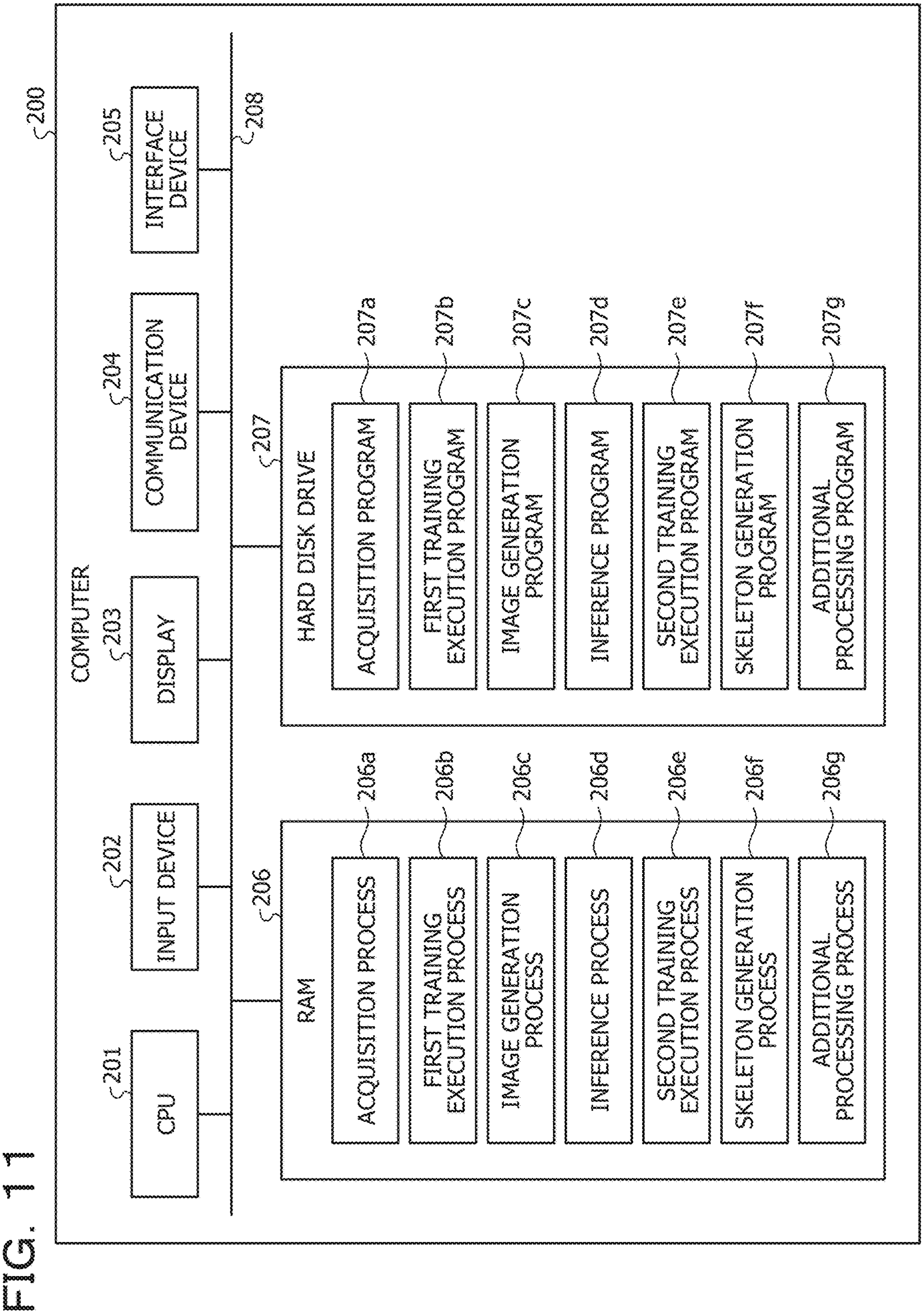
FIG. 11 is a diagram illustrating an exemplary hardware configuration of a computer that implements functions similar to those of the information processing apparatus according to the embodiment.
Figure 12:
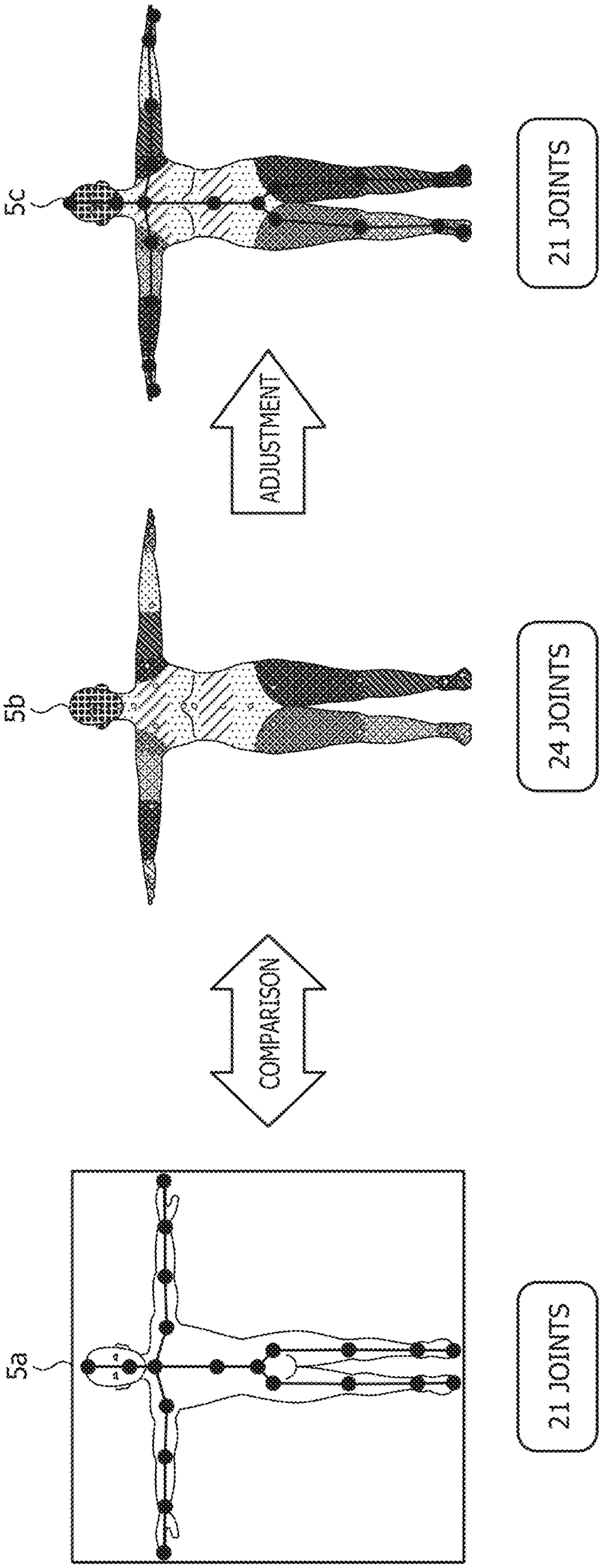
FIG. 12 is a diagram illustrating an example of joint definitions of the existing data set and the 3D body CG model.
Figure 13:
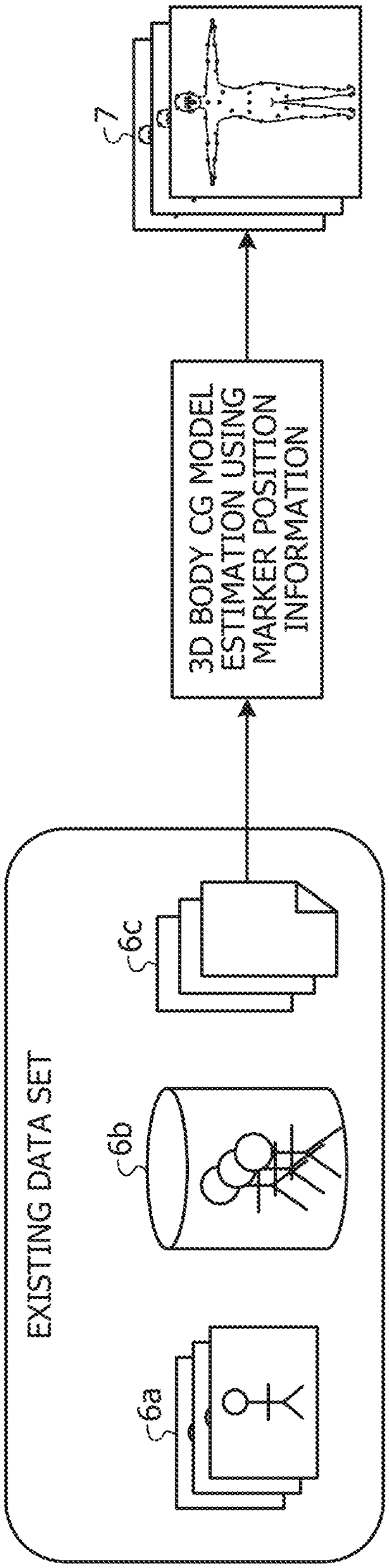
FIG. 13 is a diagram for explaining an exemplary existing technique.

Next, an exemplary hardware configuration of a computer that implements functions similar to those of the information processing apparatus 100 indicated in the embodiment described above will be described. FIG. 11 is a diagram illustrating an exemplary hardware configuration of the computer that implements functions similar to those of the information processing apparatus according to the embodiment.

As illustrated in FIG. 11, a computer 200 includes a CPU 201 that executes various types of arithmetic processing, an input device 202 that receives data input from a user, and a display 203. In addition, the computer 200 includes a communication device 204 that exchanges data with an external device or the like via a wired or wireless network, and an interface device 205. Furthermore, the computer 200 includes a RAM 206 that temporarily stores various types of information, and a hard disk drive 207. Additionally, each of the devices 201 to 207 is coupled to a bus 208.

The hard disk drive 207 includes an acquisition program 207*a*, a first training execution program 207*b*, an image generation program 207*c*, an inference program 207*d*, a second training execution program 207*e*, a skeleton generation program 207*f*, and an additional processing program 207*g*. Furthermore, the CPU 201 reads each of the programs 207*a* to 207*g*, and loads it in the RAM 206.

The acquisition program 207*a* functions as an acquisition process 206*a*. The first training execution program 207*b* functions as a first training execution process 206*b*. The image generation program 207*c* functions as an image generation process 206*c*. The inference program 207*d* functions as an inference process 206*d*. The second training execution program 207*e* functions as a second training execution process 206*e*. The skeleton generation program 207*f* functions as a skeleton generation process 206*f*. The additional processing program 207*g* functions as an additional processing process 206*g*.

Processing of the acquisition process 206*a* corresponds to the processing of the acquisition unit 151. Processing of the first training execution process 206*b* corresponds to the processing of the first training execution unit 152. Processing of the image generation process 206*c* corresponds to the processing of the image generation unit 153. Processing of the inference process 206*d* corresponds to the processing of the inference unit 154. Processing of the second training execution process 206*e* corresponds to the processing of the second training execution unit 155. Processing of the skeleton generation process 206*f* corresponds to the processing of the skeleton generation unit 156. Processing of the additional processing process 206*g* corresponds to the processing of the additional processing unit 157.

Note that each of the programs 207*a* to 207*g* may not necessarily be stored in the hard disk drive 207 in advance. For example, each of the programs may be stored in a "portable physical medium" to be inserted in the computer 200, such as a flexible disk (FD), a compact disc read only memory (CD-ROM), a digital versatile disc (DVD), a magneto-optical disk, or an integrated circuit (IC) card. Then, the computer 200 may read and execute each of the programs 207*a* to 207*g*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing training program for causing a computer to perform a process comprising:

training a first learner using an existing training dataset, the existing training dataset comprising pairs of real image data of an object and corresponding ground-truth three-dimensional skeleton data of a target joint definition, the first learner being configured to receive image data and output three-dimensional skeleton data;

obtaining a three-dimensional computer graphics (CG) model of the object, the three-dimensional CG model including a three-dimensional surface;

generating synthetic image data in which the three-dimensional CG model is rendered;

generating pseudo-ground-truth skeleton data by inputting the synthetic image data to the trained first learner the pseudo-ground-truth skeleton data conforming to the target joint definition;

executing training of a second learner using the three-dimensional CG model as an explanatory variable and the generated pseudo-ground-truth skeleton data as a corresponding objective variable;

generating, using the trained second learner, additional three-dimensional skeleton data from an additional three-dimensional CG model;

creating a new training data pair including the additional three-dimensional skeleton data and corresponding image data generated from the additional three-dimensional CG model; and retraining the first learner by adding the new training data pair to the existing training dataset.

2. The non-transitory computer-readable recording medium according to claim 1, wherein a three-dimensional joint position and a number of joints set in the three-dimensional CG model of the object that includes the three-dimensional surface are different from the three-dimensional joint position and the number of joints set in the three-dimensional skeleton data of the training data.

3. The non-transitory computer-readable recording medium according to claim 1, the training program for causing the computer to perform the process further comprising: removing a joint in skeleton data that becomes an outlier based on a reference position of the joint of the object specified based on the three-dimensional CG model of the object that includes the three-dimensional surface and a joint position in the three-dimensional skeleton data of the rendered image data.

4. The non-transitory computer-readable recording medium according to claim 1, wherein the executing the training of the second learner includes:

searching for a parameter that makes an absolute value of a difference between a multiplication value of the parameter and a vertex coordinate group of the three-dimensional CG model of the object and each joint position of the three-dimensional skeleton data of the rendered image data smaller.

5. A training method implemented by a computer, the training method comprising:

training a first learner using an existing training dataset, the existing training dataset comprising pairs of real image data of an object and corresponding ground-truth three-dimensional skeleton data of a target joint definition, the first learner being configured to receive image data and output three-dimensional skeleton data;

obtaining a three-dimensional computer graphics (CG) model of the object, the three-dimensional CG model including a three-dimensional surface;

generating synthetic image data in which the three-dimensional CG model is rendered;

generating pseudo-ground-truth skeleton data by inputting the synthetic image data to the trained first learner the pseudo-ground-truth skeleton data conforming to the target joint definition;

executing training of a second learner using the three-dimensional CG model as an explanatory variable and the generated pseudo-ground-truth skeleton data as a corresponding objective variable;

generating, using the trained second learner, additional three-dimensional skeleton data from an additional three-dimensional CG model;

creating a new training data pair including the additional three-dimensional skeleton data and corresponding image data generated from the additional three-dimensional CG model; and retraining the first learner by adding the new training data pair to the existing training dataset.

6. The training method according to claim 5, wherein a three-dimensional joint position and a number of joints set in the three-dimensional CG model of the object that includes the three-dimensional surface are different from the three-dimensional joint position and the number of joints set in the three-dimensional skeleton data of the training data.

7. The training method according to claim 5, the training method further comprising: removing a joint in skeleton data that becomes an outlier based on a reference position of the joint of the object specified based on the three-dimensional CG model of the object that includes the three-dimensional surface and a joint position in the three-dimensional skeleton data of the rendered image data.

8. The training method according to claim 5, wherein the executing the training of the second learner includes:

searching for a parameter that makes an absolute value of a difference between a multiplication value of the parameter and a vertex coordinate group of the three-dimensional CG model of the object and each joint position of the three-dimensional skeleton data of the rendered image data smaller.

* * * * *